Nov. 6, 1956

B. STAHMER 2,769,714

SLICED POTATO PRODUCT

Filed April 12, 1955

INVENTOR.
BERNHARDT STAHMER
BY Woodling & Krost
Atty's

Nov. 6, 1956

B. STAHMER 2,769,714

SLICED POTATO PRODUCT

Filed April 12, 1955

INVENTOR.
BERNHARDT STAHMER
BY Woodling & Krost
Atty's

United States Patent Office 2,769,714
Patented Nov. 6, 1956

2,769,714

SLICED POTATO PRODUCT

Bernhardt Stahmer, Omaha, Nebr.

Application April 12, 1955, Serial No. 500,840

3 Claims. (Cl. 99—100)

The invention relates in general to cooked sliced potato products and more particularly to cooked sliced potato products having one side of a corrugated configuration and the other side of a flat configuration and the method of making the same.

An object of the invention is to provide a cooked sliced potato product having a very high resistance to breaking; but when broken, as for example prior to eating, the product will break along a predetermined line thereby obviating crumbs as is the case in conventional cooked sliced potato products.

Another object of the invention is to provide a cooked sliced potato product with a series of alternately spaced ridges and grooves extending across a face thereof and having another face thereof with a substantially smooth configuration whereby when said sliced potato product is cooked a controlled curving of the product is effected.

Another object of the invention is to provide a cooked sliced potato product having downturned side portions and upturned end portions which form generally the configuration of a "saddle."

Another object of the invention is to provide a cooked sliced potato product with a series of perforations extending from one face of the potato product to another face thereof.

Another object of the invention is to provide a cooked sliced potato product having arcuate ridges and grooves extending across a face thereof which ridges and grooves have a radius of curvature preferably in the range of from approximately three inches to nine inches.

Another object of the invention is to provide a cooked sliced potato product having a new and novel construction which imparts a new and altogether different flavor to the product.

Another object of the invention is to provide a cooked sliced potato product having an overall thickness, and having a series of ridges and grooves extending arcuately across one face thereof and having another face thereof of a substantially smooth configuration with the amplitude of the ridges being greater than the thickness from the bottom of the grooves to the flat face thereof and with this thickness being in the range of one-fourth to one-half of the overall thickness and with the ridges per inch being in the range of from three per inch to twenty-five per inch and with the distance between each ridge being greater than one-half of the thickness from the bottom of the grooves to the flat face whereby the production of a sliced potato product having the above ratios with respect to the various dimensions will produce a product when cooked in a liquid cooking medium which is crisp throughout and with a new and novel taste as a result of the various ratios between the respective above-mentioned portions of the sliced potato product.

Another object of the invention is to provide a cooked sliced potato product having a controlled curvature which gives improved packaging.

Another object of the invention is to provide a cooked sliced potato product having ridges of a given amplitude on one side which are greater than the thickness from the base of the ridges to another side of the sliced potato product.

Another object of the invention is to provide a method of slicing, perforating, and cooking a sliced potato product whereby a potato product results which has alternate arcuate ridges and grooves extending across one face thereof and has another face thereof with a substantially smooth configuration and which has perforations extending therethrough whereby in the cooking process a more edible and better tasting cooked sliced potato product is produced.

Another object of the invention is the process of making a cooked sliced potato product which is new and novel in appearance and has a radically new and delightful taste.

Another object of the invention is the process of making a cooked sliced potato product which has a juncture which defines a clean breakage line and when the potato product is broken along this breakage line, a clean break results without the usual resulting potato product crumbs.

Other objects and a fuller understanding of this invention may be had by referring to the following description and claims, taken in conjunction with the accompanying drawings, in which:

Figure 1:
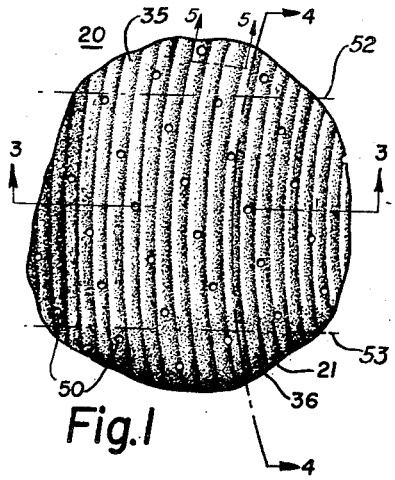
Figure 1 is a top view of the cooked sliced potato product of this invention.
Figure 4:
Figure 4 is a cross sectional view taken along the line 4—4 of Figure 1.
Figure 3:
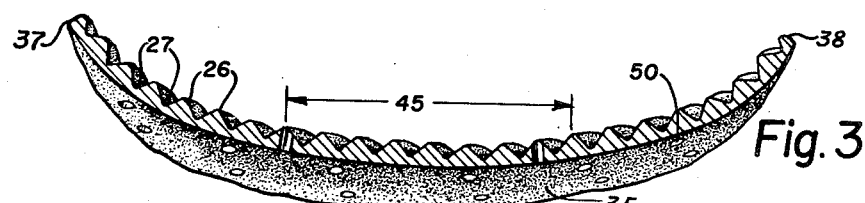
Figure 3 is a cross sectional view taken generally along the line 3—3 of Figure 1 and is shown as being enlarged to approximately twice the size as shown in Figure 1.
Figure 5:
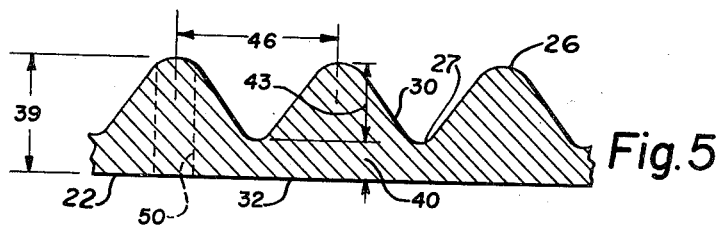
Figure 5 is an enlarged view taken generally along line 5—5 of Figure 1.

The cooked sliced potato product of this invention is indicated generally by the reference numeral 20 and comprises first and second oppositely disposed sides or faces 21 and 22 respectively. The first side 21 of the cooked sliced potato product is provided with a plurality of alternately spaced ridges 26 and grooves 27. The ridges 26 and grooves 27 extend arcuately across the first face 21 of the cooked sliced potato product 20. As best seen in Figures 3 and 5, the ridges 26 and grooves 27 form a wave on the first side 21 which may be referred to as being substantially sinusoidal in nature. This sinusoidal wave is indicated by the reference numeral 30. The second face or side 22 has a substantially smooth surface 32 and is therefore smooth as compared to the wavy surface of the first side. The cooked sliced potato product 20 has first and second substantially oppositely downturned side portions 35 and 36 which are best seen in Figures 1 and 4 of the accompanying drawings. The cooked sliced potato product also has first and second generally upturned end portions 37 and 38 respectively, as best seen in Figure 3 which gives the cooked sliced potato product the general appearance of an elongated U-shape as seen in Figure 3. These upturned end portions extend in a direction which is generally transverse to the direction of the ridges 26 and the grooves 27. From a viewing of the first four figures of the drawings, it can be seen that the potato product of this invention forms a three-dimensional figure which is similar to a "saddle" in shape. The first and second downturned side portions 35 and 36 form the portion of the saddle in which the rider sits and the end portions 37 and 38 form the portion of the saddle which fits on the horses back. During the cooking process, the side portions 35 and 36 bend downwardly and the end portions 37 and 38 bend upwardly, as illustrated in the accompanying drawings, and hence give a controlled curving of the potato product which provides many advantages which will be hereinafter discussed.

As shown in Figure 5, the cooked sliced potato product 20 has a maximum thickness as measured from the top of the ridges 26 to the second face 22 and is indicated by the reference numeral 39 and a thickness from the bottom of the grooves 27 to the second face 22 is indicated by the reference numeral 40. The thickness 40 is approximately in the range of from one-fourth to one-half of the maximum thickness 39. For example, if the maximum thickness 39 were in the order of one hundred twenty-thousandths of an inch, then the thickness 40 would be in the range of from thirty thousandths to sixty thousandths of an inch. The ridges 26, as best seen in Figure 5, have an amplitude 43 of a value which is greater than the thickness 40 from the bottom of the grooves 27 to the second face 22. The ridges 26 have a pitch 45 of from at least three ridges per inch to twenty-five ridges per inch. The length of the pitch between each of the peaks of the ridges 26 is indicated by the reference numeral 46 and is greater than one-half of the thickness 40 from the bottom of the grooves 27 to the second face 22. The cooked sliced potato product has a series of spaced perforations 50 which extend from the first face 21 through the potato product 20 to the second face 22.

Figure 6:
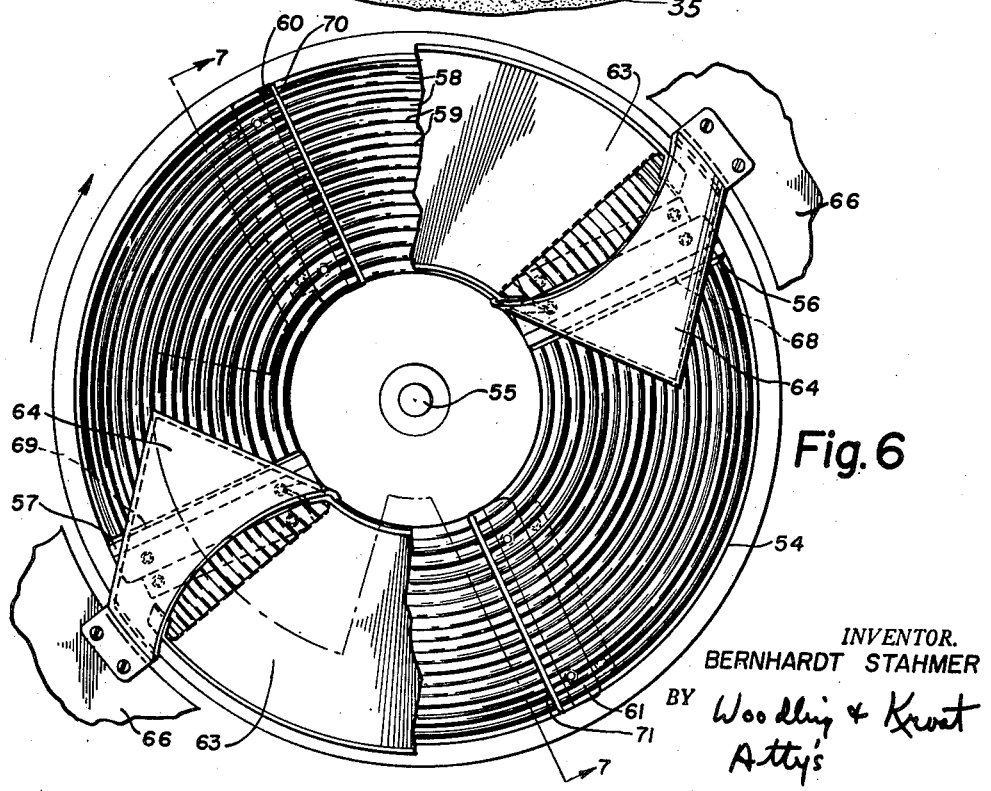
Figure 6 is a plan view of a rotary table slicing machine for slicing the potato product of this invention.
Figure 7:
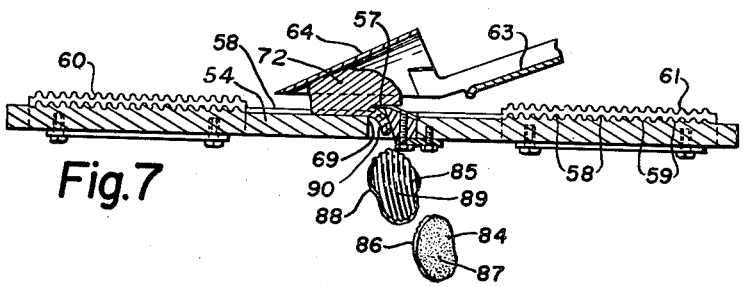
Figure 7 is a view taken generally along the line 7—7 of Figure 6.
Figure 8:
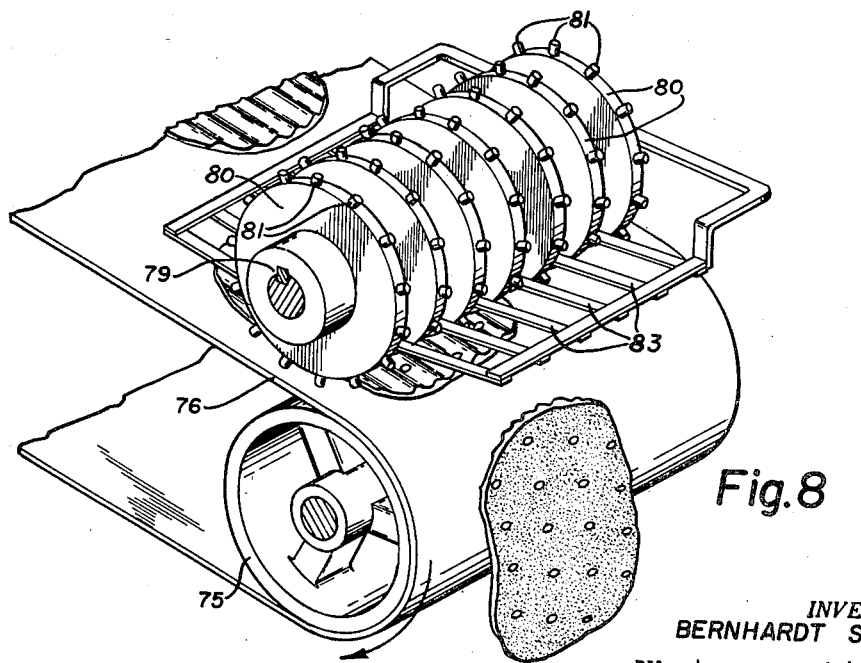
Figure 8 is an isometric view of a machine illustrating the method of perforating the sliced potato product of this invention.

The method of producing the sliced potato product 20 of this invention is shown generally by Figures 6, 7 and 8. Figure 6 shows a rotatable cutting table 54 mounted for rotation about a shaft member 55. The cutting table 54 is provided with a first and a second straight-edged knife 56 and 57 which are disposed at approximately one hundred eighty degrees from each other. A first and a second corrugated knife 60 and 61 are attached to the cutting table 54 and are located approximately one hundred eighty degrees from each other and approximately ninety degrees from each of the straight-edged knives 56 and 57. It will be readily apparent that any number of knives may be attached to the cutting table 54 and of course may be spaced in nearly any manner with respect to each other. A potato feed shute 63 extends from a position above the cutting table 54 and terminates in a triangular shaped pocket 64 at a position just vertically adjacent the cutting table 54. As shown in Figure 6, two potato feed shutes have been illustrated and are shown as being attached to a structure 66 which has been shown only partially; but illustrates that the feed shutes 63 are attached other than to the rotating cutting table 54. Any suitable means may be provided for rotating the cutting table 54. The cutting table 54 is provided with openings 68, 69, 70 and 71 which are located immediately beneath the cutting edges of the respective knives 56, 57, 60 and 61 respectively. The use to which these openings are put is best illustrated in Figure 7 of the accompanying drawings. It can be seen that as the cutting table is rotated each of the respective knives makes a pass through a potato 72 which is located in the triangular pocket 64 of the potato feed shute 63. As shown in Figure 7, two potato slices 84 and 85 are shown as having fallen through the opening 69 in the cutting table 54. The corrugated knife 61 in passing through the potato 72 produced a corrugated side 86 on the potato slice 84. As the cutting table is rotated in the direction as indicated by the directional arrow in Figure 6, the next knife to pass through the potato was the straight knife 56. As the straight knife 56 passed through the potato 72, it severed the slice 84 from the potato thereby producing a straight side 87 on the slice 84 and a straight side 88 on the slice 85. The next knife to pass through the potato was the corrugated knife 60 which severed the slice 85 from the potato 72 thereby producing a corrugated side 89 on the slice 85 and a corrugated side 90 on the potato 72. As shown in Figure 7, the straight-edged knife 57 is progressing through the potato 72 thereby producing a straight side on the slice which is being severed from the potato and also producing the straight side for a slice which is to be severed subsequently by the passage of the corrugated knife 61 through the potato 72.

Although the mechanical parts in the rotary cutting machine of Figures 6 and 7 may be of nearly any dimension it has been found that the inner extremities of the knives 56, 57, 60 and 61 are preferably located approximately three and one-eighths inches from the centerline of the shaft 55 and the outer extremities are located approximately nine inches from the centerline of the shaft. This means that the arcuate ridges and grooves of the corrugated sides of the cooked sliced potato products have a radius of curvature which varies approximately in the range of three and one-eighth inches at one end thereof to nine inches at another end thereof.

Figure 8 shows generally a perforating machine 74 which includes a rotatable pulley 75 which snugly engages a conveyor belt 76, thereby continuously moving the conveyor belt about the rotatable pulley. A rotatable shaft 79 is provided above the rotatable pulley 75 and carries thereon a series of circular discs 80. The circular discs 80 have outer peripheries which are defined by a series of circular perforating members 81, but it should be readily recognized that these perforating members may be of many other shapes and designs. The perforating members 81 lie on what might be referred to as a cylindrical surface. The circular perforating members 81 engage the conveyor belt 76 and upon movement of the conveyor belt 76 are caused to rotate along with the rotatable shaft 79. Upon movement of the conveyor belt 76, sliced potato products residing thereon are caused to be carried between the surface of the conveyor belt and the circular perforating members 81 thereby providing a series of spaced perforations therein which extend from one face of the sliced potato product to the other. A series of scraper bars 83 have been provided and extend generally transversely to the direction of the rotatable shaft 79 and between the circular discs 80 which are provided on the rotatable shaft 79. The reason for providing the scraper bars 83 is to prevent the slices of potato product which tend to adhere to the circular perforating members from being carried with these perforating members in their arcuate travel. In other words, the scraper bars insure that all of the potato products which pass between the conveyor belt and the circular discs are removed from the circular discs and hence are caused to pass off the conveyor belt.

After the perforated potato slice has been removed from the perforating machine, it is then taken and placed in a liquid cooking medium wherein it is cooked to the desired consistency. It will thus be seen from the Figures 6, 7 and 8 that the basic steps in producing the cooked sliced potato product of this invention are the steps as shown in Figure 6 of slicing a potato with a substantially straight-edged knife, which knife travels in an arcuate direction and then slicing the potato with a substantially sinusoidal edged or corrugated knife which also extends or moves in an arcuate direction. The potato slice which results from these two operations is then perforated from one of its faces to the other as shown in Figure 8 and is then taken to a liquid cooking medium where it is cooked.

The grooves 27 across the first face of the cooked sliced potato product define what might be referred to as arcuate juncture lines and also define flexing areas. With this type of "saddle" construction, the potato product of this invention flexes or bends a maximum distance before breaking. In other words, the potato product of this invention will absorb a great deal of force by this flexing or bending movement which other potato products cannot do because of their peculiar construction and therefore resultant breakage with the product of this invention, as for example in shipping, will be a great deal less than with conventional potato products. Although it is not completely understood exactly why the desirable "saddle" shape is produced quite consistently by this invention, it is believed to be because the one side of the potato product is sliced flat and the other side is sliced with an arcuate corrugation.

The juncture lines which the grooves 27 define provide a clean line of breakage along which the potato product will break if sufficient force is applied thereto. When the potato product is broken along the juncture lines, a clean break will result thereby obviating the resulting crumbs which always result from conventional potato products. One of the prime examples of the desirability of this type of potato product will be readily apparent when one considers the eating of sliced potato products. Everyone who has eaten potato products of the type having smooth opposed surfaces, which are generally referred to as the Saratoga potato chip, finds that it is substantially impossible to nibble or take a bite out of the chip without having the entire chip break in small pieces making a crumby mess. However, with the applicant's potato product, this crumby mess may be avoided by simply grasping the potato product and bending it sufficiently to cause it to break along the arcuate longitudinal groove. In fact, one single potato product of applicant may be broken up into several sections, each constituting an elongated bite-size section which may be consumed in one bite. It has been found that the applicant's sliced potato product may be readily broken into sections without forming a mess and the eating thereof is greatly facilitated by using the bite-size sections.

The controlled curving of the cooked sliced potato product resulting during the cooking process thereby producing the downturned side portions and the upturned end portions in the shape of the saddle is a very important feature of this invention from a strength standpoint and from a packaging standpoint. From a strength standpoint, the above-mentioned saddle shape gives the maximum in strength for the material involved herein. Since the method of making the cooked sliced potato product of this invention results consistently in the saddle shape except for possible incidental conditions where the potato slices become congested when they pass through the cooking machine, a better packaging effect is had with the product of this invention. While the entire cooked sliced potato product tends to curve generally, the major part of the curving occurs in the downturned side portions 35 and 36. The downturned side portion 35 starts at about the horizontal dash-dot line 52 as shown in Figure 1, and the downturned side portion 36 starts at about the horizontal dash-dot line 53 as shown and seen in Figure 1.

The perforations which have been provided and taught by this invention aid the liquid cooking medium to more thoroughly penetrate and cook the sliced potato product thereby producing a better tasting and more edible product. The perforations also prevent bubbles which result in the cooking process of conventional type potato products from forming thereby giving the potato product of this invention a consistent surface area.

The table 54 is provided with a plurality of alternate ridges 58 and a plurality of alternate grooves 59 which extend circumferentially thereabout to provide a corrugated rotatable table top. The corrugations on the table 54 are of substantially the same configuration as those of the corrugated knives 60 and 61. The purpose and desirability of the alternate ridges 58 and grooves 59 in the rotating table 54 in conjunction with the level at which the knives are located is that they prevent the first slice which is taken from an uncut potato as it comes down the chute and onto the table 54 from being too thick so that it will not cook satisfactorily. As will be noted in Figure 7, the straight edged knife 57 travels at a level which is substantially in the same plane as the bottoms of the grooves in the corrugated knives 60 and 61.

Assume that an uncut potato has just passed down the chute 63 into the pocket 64. Since the uncut potato will be supported on the tops of the ridges 58 and in view of the level at which the knives are located, it will make no difference whether a straight knife or a corrugated knife cuts the potato first. If the straight knife passes through the potato first the thickness of the slice can be no greater than the vertical distance between the level at which the straight edged knife is located and travels and the tops of the ridges 58 of the table 54 on which the potato is supported. That is to say, the thickness of this first slice will be no greater than the distance 40 in Figure 5. If the corrugated knife passes through the uncut potato first, a slice would be produced which has a cross section similar to that shown in Figure 5, assuming that the bottom of the potato is flat like the surface 32 in Figure 5. In other words, it would be impossible to cut a slice from the uncut potato which would be too thick to cook satisfactorily.

Figure 2:
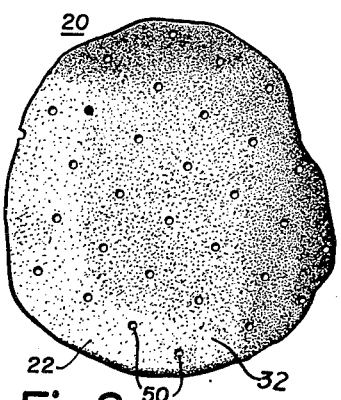
Figure 2 is a bottom view of the potato product of Figure 1.

If a flat topped table were utilized in place of the corrugated table top shown in Figures 6 and 7 and if the first knife to cut the potato were a corrugated knife, then the slice would be similar to that shown in Figure 5 assuming that the bottom of the potato were flat like the surface 32. If the first slice was cut by a straight knife, then the total thickness of the first slice, both sides being flat, would be the same as the distance 39 in Figure 5. The potato slices which are cut after the first slice will be the same as that shown in Figures 1 and 2. In other words, with a flat topped table, if the straight knives were adjusted to cut the first slice, then of course it would be impossible to cut the corrugated slices as shown in Figures 1 and 2.

In Figure 7, the wavy line to which the lead line from the reference character 60 touches represents the top surface of the corrugated knife 60 and is shown in this manner for the sake of clarity in the illustration. The wavy lines to which the lead line from the reference character 61 touches indicates the top surface of the corrugated knife 61 which is the same as the sharp cutting edge of the knife and is shown in this manner for the sake of clarity and illustration. No attempt has been made to show that the knives 60 and 61 have thickness because this would encumber the drawing whereby nothing would appear clearly.

The alternate ridges and grooves also serve the valuable purpose of receiving the corrugated side of the potato after a corrugated knife has passed therethrough whereby the potato is kept from rotating or sliding radially on the table and is thereby held firmly preparatory to being cut by another knife.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A sliced potato product comprising, first and second oppositely disposed faces, said first face having a plurality of alternately spaced ridges and grooves, said ridges and grooves having a radius of curvature in the range of from three inches to nine inches, said second face of said sliced potato product having a substantially smooth surface, said sliced potato product having a maximum thickness from the top of said ridges to said second face, the thickness from the bottom of said grooves to said second face of said sliced potato product being approximately in the range of from one-fourth to one-half of said maximum thickness, said ridges having an amplitude of a value which is greater than said thickness from the bottom of said grooves to said second face, said ridges having a pitch in a range of from at least three per inch to twenty-five per inch, the length of the pitch between each of the peaks of each of said ridges being greater than one-half of said thickness from the bottom of said grooves to said second face, said sliced potato product having a series of spaced perforations extending from one face to the other face thereof.

2. A sliced potato product comprising, first and second oppositely disposed faces, said first face having a plurality of alternately spaced ridges and grooves, said second face of said sliced potato product having a substantially smooth surface, said sliced potato product having a maximum thickness from the top of said ridges to said second face, the thickness from the bottom of said grooves to said second face of said sliced potato product being approximately in the range of from one-fourth to one-half of said maximum thickness, said ridges having an amplitude of a value which is greater than said thickness from the bottom of said grooves to said second face, said ridges having a pitch in a range of from at least three per inch to twenty-five per inch, the length of the pitch between each of the peaks of each of said ridges being greater than one-half of said thickness from the bottom of said grooves to said second face, said sliced potato product having a series of spaced perforations extending from one face to the other face thereof.

3. A sliced potato product comprising, first and second oppositely disposed faces, said first face having a plurality of alternately spaced ridges and grooves arcuately thereacross, said second face of said sliced potato product having a substantially smooth surface, said sliced potato product having a maximum thickness from the top of said ridges to said second face, the thickness from the bottom of said grooves to said second face, the thickness from the bottom of said grooves to said second face of said sliced potato product being approximately in the range of from one-fourth to one-half of said maximum thickness, said ridges having an amplitude of a value which is greater than said thickness from the bottom of said grooves to said second face, said ridges having a pitch in a range of from at least three per inch to twenty-five per inch, the length of the pitch between each of the peaks of each of said ridges being greater than one-half of said thickness from the bottom of said grooves to said second face.

References Cited in the file of this patent
UNITED STATES PATENTS

| | | |
|---|---|---|
| 678,514 | Regnier | July 16, 1901 |
| 2,567,248 | Stahmer | Sept. 11, 1951 |
| 2,612,453 | Stahmer | Sept. 30, 1952 |